US012668137B2

(12) United States Patent
Park et al.

(10) Patent No.: US 12,668,137 B2
(45) Date of Patent: Jun. 30, 2026

(54) SILENCER AND VEHICLE INCLUDING THE SAME

(71) Applicants: Hyundai Motor Company, Seoul (KR); Kia Corporation, Seoul (KR); Sejong Ind. Co., Ltd., Ulsan (KR)

(72) Inventors: Ki Ho Park, Hwaseong-si (KR); Jong Yeol Lee, Bucheon-si (KR); Jun Ho Jang, Yongin-si (KR); Hyun Soo Kim, Ulsan (KR)

(73) Assignees: HYUNDAI MOTOR COMPANY, Seoul (KR); KIA CORPORATION, Seoul (KR); SEJONG IND. CO., LTD., Ulsan (KR)

( * ) Notice: Subject to any disclaimer, the term of this patent is extended or adjusted under 35 U.S.C. 154(b) by 280 days.

(21) Appl. No.: 18/431,654

(22) Filed: Feb. 2, 2024

(65) Prior Publication Data

US 2025/0128613 A1     Apr. 24, 2025

(30) Foreign Application Priority Data

Oct. 19, 2023     (KR) ........................ 10-2023-0140359

(51) Int. Cl.
F01N 1/02          (2006.01)
B60L 50/72        (2019.01)
          (Continued)

(52) U.S. Cl.
CPC ......... B60L 50/72 (2019.02); B60L 2270/142 (2013.01)

(58) Field of Classification Search
CPC ... F01N 1/02; F01N 1/026; F01N 1/04; F01N 1/08; F01N 1/082; F01N 1/083; F01N 1/089; F01N 3/005; F01N 3/02; F01N 13/18; F01N 13/1838; F01N 13/1888; F01N 2570/22; F01N 2570/00; F01N 2240/32; F01N 2470/08; F01N 2470/24; F01N 2450/30; F01N 2450/40; F01N 2490/02;
          (Continued)

(56) References Cited

U.S. PATENT DOCUMENTS 1,800,354 A * 4/1931 Powell .................... F01N 1/003
                                                      181/269
1,816,109 A * 7/1931 Bourne ..................... F01N 1/02
                                                      181/264
          (Continued)

FOREIGN PATENT DOCUMENTS

KR        20180069619 A    6/2018
KR        20240075975 A *  5/2024 ............. F01N 3/005
WO    WO-2024109995 A2 *  5/2024 .......... H01M 8/0662

*Primary Examiner* — Edgardo San Martin
(74) *Attorney, Agent, or Firm* — Slater Matsil, LLP

(57)          ABSTRACT

In an embodiment, a silencer of a vehicle's exhaust system for a fuel cell system is capable of reducing high-frequency noise and reducing noise generated from a drain, wherein the silencer includes a housing having an inlet and an outlet, a perforated tube located in the housing, the perforated tube having a plurality of through-holes, at least one baffle interposed between the housing and the perforated tube to partition a space between the housing and the perforated tube into a plurality of resonance chambers, and a cover installed in the housing to support the perforated tube and to partition the most downstream resonance chamber.

20 Claims, 8 Drawing Sheets

(51) Int. Cl.
  F01N 1/04 (2006.01)
  F01N 1/08 (2006.01)

(58) Field of Classification Search
  CPC ............. F01N 2490/04; F01N 2490/08; F01N 2490/10; F01N 2490/20; H01M 8/04141; H01M 8/04119; H01M 8/04082; H01M 8/04; Y02T 90/40
  See application file for complete search history.

(56) References Cited

U.S. PATENT DOCUMENTS

| | | | | | |
|---|---|---|---|---|---|
| 1,845,903 | A | * | 2/1932 | Bourne | F01N 13/1855 |
| | | | | | 181/264 |
| 1,975,861 | A | * | 10/1934 | Oldberg | F01N 1/04 |
| | | | | | 181/250 |
| 2,059,487 | A | * | 11/1936 | Peik | F01N 1/006 |
| | | | | | 181/252 |
| 2,139,151 | A | * | 12/1938 | Deremer | F01N 1/023 |
| | | | | | 181/250 |
| 2,343,152 | A | * | 2/1944 | Marx | F01N 13/1844 |
| | | | | | 181/249 |
| 2,498,979 | A | * | 2/1950 | Bourne | F01N 3/04 |
| | | | | | 181/260 |
| 2,732,026 | A | * | 1/1956 | Folts | F01N 1/06 |
| | | | | | 181/231 |
| 3,685,616 | A | * | 8/1972 | Malkiewicz | F01N 1/084 |
| | | | | | 181/266 |
| 4,212,657 | A | * | 7/1980 | Urbinati | F01N 3/037 |
| | | | | | 55/482 |
| 4,213,414 | A | * | 7/1980 | Sato | F01N 1/22 |
| | | | | | 181/282 |
| 4,218,228 | A | * | 8/1980 | Hiraoka | F01N 3/06 |
| | | | | | 55/455 |
| 4,278,147 | A | * | 7/1981 | Watanabe | F01N 1/089 |
| | | | | | 181/256 |
| 5,627,351 | A | * | 5/1997 | Okuma | F01N 1/08 |
| | | | | | 181/231 |
| 5,969,299 | A | * | 10/1999 | Yamaguchi | F01N 1/24 |
| | | | | | 181/227 |
| 6,846,586 | B2 | * | 1/2005 | Aramaki | B60L 58/30 |
| | | | | | 429/429 |
| 7,416,580 | B2 | * | 8/2008 | Nyman | B01D 46/525 |
| | | | | | 96/380 |
| 7,743,883 | B2 | * | 6/2010 | Kondo | H01M 8/04156 |
| | | | | | 181/252 |
| 7,934,581 | B2 | * | 5/2011 | Kim | F02M 35/1216 |
| | | | | | 123/184.55 |
| 9,010,485 | B2 | * | 4/2015 | Bornemann | F02M 35/1266 |
| | | | | | 123/184.57 |
| 9,038,772 | B2 | * | 5/2015 | Heo | H01M 8/04291 |
| | | | | | 181/258 |
| 9,625,077 | B2 | * | 4/2017 | Barbolini | F16L 55/033 |
| 10,403,256 | B2 | * | 9/2019 | Denker | F02M 35/1266 |
| 10,648,379 | B2 | * | 5/2020 | Na | B60L 50/72 |
| 10,900,449 | B2 | * | 1/2021 | Shin | F02M 35/1216 |
| 10,907,517 | B2 | * | 2/2021 | Qi | F01N 1/026 |
| 11,220,949 | B2 | * | 1/2022 | Teramoto | F01N 13/1805 |
| 11,448,172 | B2 | * | 9/2022 | Lee | F02M 35/1283 |
| 11,912,210 | B2 | * | 2/2024 | Molascon | F02M 35/1283 |
| 11,946,398 | B1 | * | 4/2024 | Le | F01N 1/026 |
| 2018/0171842 | A1 | | 6/2018 | Na et al. | |

* cited by examiner

SILENCER AND VEHICLE INCLUDING THE SAME

CROSS-REFERENCE TO RELATED APPLICATIONS

This application claims the benefit of Korean Patent Application No. 10-2023-0140359, filed on Oct. 19, 2023, which application is hereby incorporated herein by reference.

TECHNICAL FIELD

The present disclosure relates to a silencer for a vehicle.

BACKGROUND

A fuel cell vehicle using a fuel cell system is provided with an exhaust system discharging exhaust from a fuel cell. The exhaust system is configured to discharge moisture, unreacted hydrogen, and unreacted air generated during power generation reaction in a fuel cell stack.

In the exhaust systems, high-frequency noise, such as that of high-speed airflow, may be generated, so a silencer may be installed to reduce noise. A sound-absorbing material formed of glass wool, high-density polyethylene (HDPE), or the like, is formed inside the silencer, to reduce noise.

In such a silencer, the greater an amount of sound-absorbing material, the greater a noise reduction effect, so a high-performance silencer requires a large space and a large amount of costs for a large amount of sound-absorbing material. Nevertheless, the effect of reducing noise compared to cost is insignificant. Moreover, a position of the sound-absorbing material is designed so that discharge sound of water discharged into a drain cannot be reduced.

SUMMARY

The present disclosure relates to a silencer capable of reducing high-frequency noise as well as discharge noise generated from a drain, and a vehicle including the same.

An embodiment of the present disclosure is a silencer that can reduce high-frequency noise as well as discharge noise generated from a drain and a vehicle including the same.

According to an embodiment of the present disclosure, a silencer may include a housing having an inlet and an outlet, a perforated tube disposed in the housing, the perforated tube having a plurality of through-holes, at least one baffle interposed between the housing and the perforated tube to partition a space between the housing and the perforated tube into a plurality of resonance chambers, and a cover installed in the housing to support the perforated tube and partition the most downstream resonance chamber.

The housing may include a first case having an outer tube and an inner tube, and a second case coupled to the first case, wherein the inlet may be formed in the outer tube, and the outlet may be formed in the second case.

A plurality of spacers may be disposed between the outer tube and the inner tube to support the inner tube relative to the outer tube and maintain a gap between the outer tube and the inner tube, and a separation space between the outer tube and the inner tube may communicate with an internal space of the housing.

The perforated tube may be radially inwardly spaced apart from the inner tube and accommodated in the first case. A through-hole may be formed in the cover. One end of the perforated tube may be connected to the inlet. The other end of the perforated tube may be connected to the through-hole.

The baffle may include a first baffle, and the first baffle may be located at an upstream end of the inner tube, to partition a first resonance chamber formed as a space between the outer tube and the perforated tube, and a second resonance chamber formed as a space between the inner tube and the perforated tube.

The first resonance chamber may include the separation space, and the first resonance chamber may reduce noise of a frequency that is lower than that of the second resonance chamber.

The baffle may further include a second baffle located downstream of the first baffle, and the second baffle may partition a space between the inner tube and the perforated tube into the second resonance chamber and an auxiliary resonance chamber.

The second baffle may include at least one drain hole perforated in an axial direction of the housing, and the drain hole may be disposed below the second baffle.

The cover may further include an extension tube formed to protrude upstream from the inner tube and the perforated tube, and an end of the extension tube may be in contact with the baffle.

The extension tube may include a partition wall formed between the inner tube and the perforated tube to extend in a direction intersecting an axial line of the perforated tube, and by the partition wall, the extension tube may be divided into a first extension portion located upstream of the partition wall and a second extension portion located downstream of the partition wall.

A space between the extension tube and the perforated tube may be divided into a first auxiliary resonance chamber partitioned by the first extension portion and the partition wall, and a second auxiliary resonance chamber partitioned by the second extension portion and the partition wall.

By adjusting an axial length of the first extension portion and the second extension portion and a distance of the first extension portion and the second extension portion from the perforated tube, respectively, a volume of the first auxiliary resonance chamber and the second auxiliary resonance chamber may be changed.

Each of the cover, the partition wall, and the second extension portion may include at least one drain hole, and the drain hole may be positioned below the cover, the partition wall, and the second extension portion.

The plurality of through-holes may be arranged in an upper region from about half the height to the top surface in a vertical direction of the perforated tube.

A perforation rate, which can be a ratio of an area of the plurality of through-holes to a surface area of the perforated tube, may be set to be within a range of 10 to 20%.

The silencer may further include an etching filter disposed downstream of the perforated tube and the cover in the housing to separate liquid from fluid.

The housing can be disposed downstream of the perforated tube and the cover, and may include a drain formed to communicate with the outside.

A sound-absorbing material may be at least partially located in the most downstream resonance chamber.

According to an embodiment of the present disclosure, a vehicle may include an exhaust system and a silencer located in the exhaust system, and having a plurality of resonance chambers partitioned by a perforated tube and at least one baffle in a housing.

The exhaust system may be connected to a humidifier of a fuel cell system.

As set forth above, according to an embodiment of the present disclosure, not only can high-frequency noise be significantly reduced in a limited space without a separate sound-adsorbing material, but there can be a lack moisture adsorption by a sound-absorbing material, which can be effective in maintaining constant noise reduction performance.

In addition, according to an embodiment of the present disclosure, costs may be reduced because a separate sound-absorbing material can be omitted, thereby improving competitiveness of a product.

In addition, according to an embodiment of the present disclosure, a gas-liquid separation space may be located downstream of a noise reduction space, thereby achieving an effect of reducing discharge sound of water discharged through a drain tube.

BRIEF DESCRIPTION OF THE DRAWINGS

The above and other features, and advantages of the present disclosure can be more clearly understood from the following detailed description, taken in conjunction with the accompanying drawings, in which.

DETAILED DESCRIPTION OF ILLUSTRATIVE EMBODIMENTS

Figure 1:
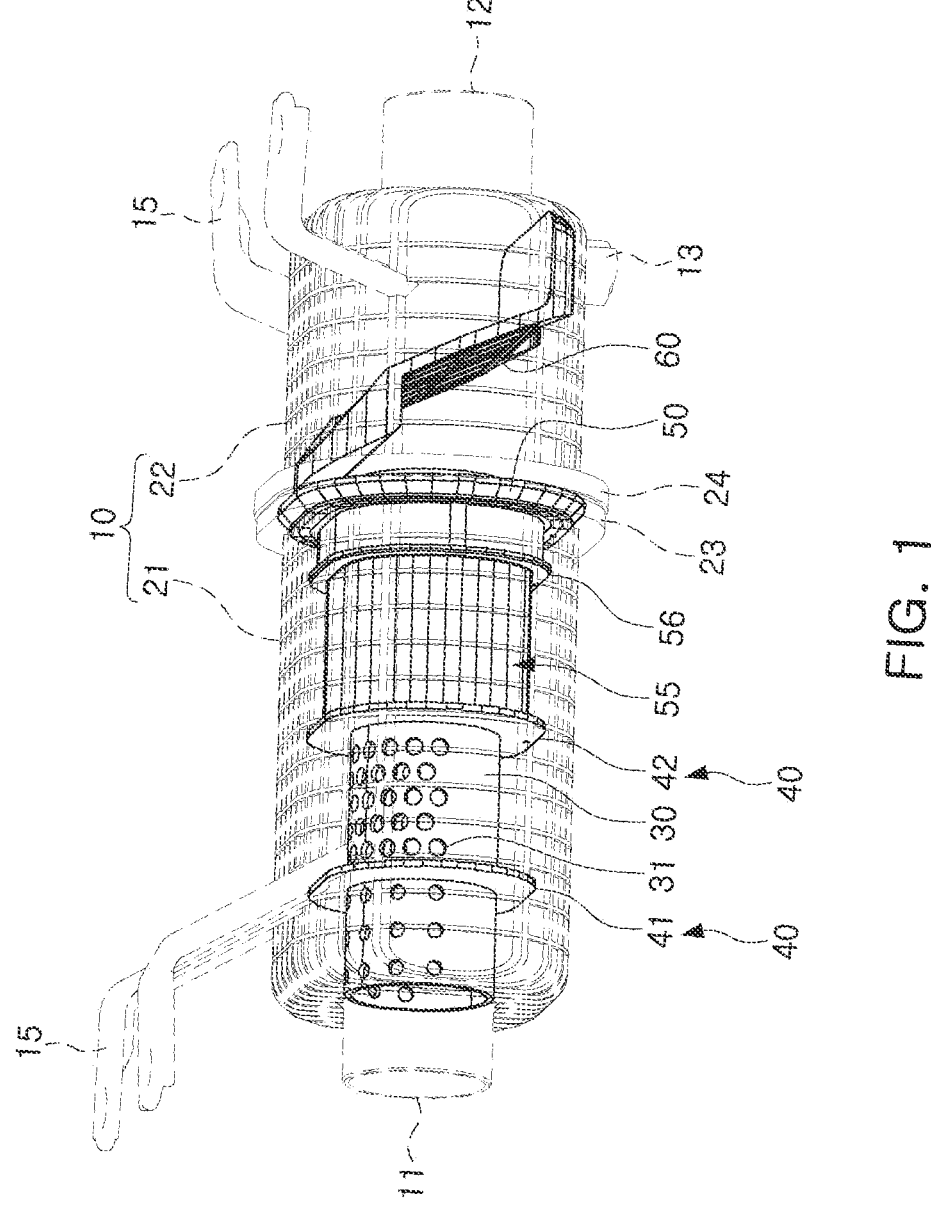
FIG. 1 is a transparent perspective view illustrating a silencer according to an embodiment of the present disclosure.

To increase an output of a fuel cell stack and dilute concentration of unreacted hydrogen, a fuel cell vehicle may adjust internal pressure of a fuel cell stack by blowing air from an air compressor located upstream of a humidifier, while connecting an exhaust system to the humidifier, and using an air pressure control valve. For this reason, high-frequency noise can be generated in the exhaust system as high-speed and high-flow fluid flows stream through a pipe. Accordingly, a silencer to reduce noise can be installed in the exhaust system of a fuel cell vehicle, and in particular, a configuration to reduce high-frequency noise may be used inside the silencer.

In addition, a drain tube can be connected to the silencer to discharge air and water, so a diameter of the drain tube can be designed to be small to prevent corrosion or contamination. For this reason, noise generated when fluid is discharged at high speed through the drain tube can be loud, and such noise can flow into an interior of the fuel cell vehicle while driving.

Embodiments of the present disclosure include a silencer that can reduce not only high-frequency noise but also discharge sound of water generated from a drain by omitting a sound-absorbing material and applying a plurality of resonance chambers.

When adding reference numerals to components in each drawing, identical components may be given the same reference numerals as much as possible even if they are shown in different drawings.

In this specification, a vehicle can refer to various vehicles for moving transported objects, such as people, animals, or goods, from a starting point to a destination, for example. The vehicle is not necessarily limited to a vehicle that is travelling on roads or tracks.

However, in this specification, for convenience of explanation, the present disclosure is described by using an example in which a vehicle is a fuel cell vehicle using a fuel cell system, but embodiments of the present disclosure are not necessarily limited thereto, and embodiments of the present disclosure may also be applied to any other vehicle equipped with an exhaust system, for example.

In addition, terms such as "first," "second," and the like may be used to describe various components. However, such terms do not necessarily limit order, size, position, importance, and the like of components, and can be used only to distinguish a component from another component.

In addition, terms such as "upper portion," "lower portion," "top and bottom," and the like can be used in relation to direction based on a vehicle or a vehicle body, for example.

Figure 2:
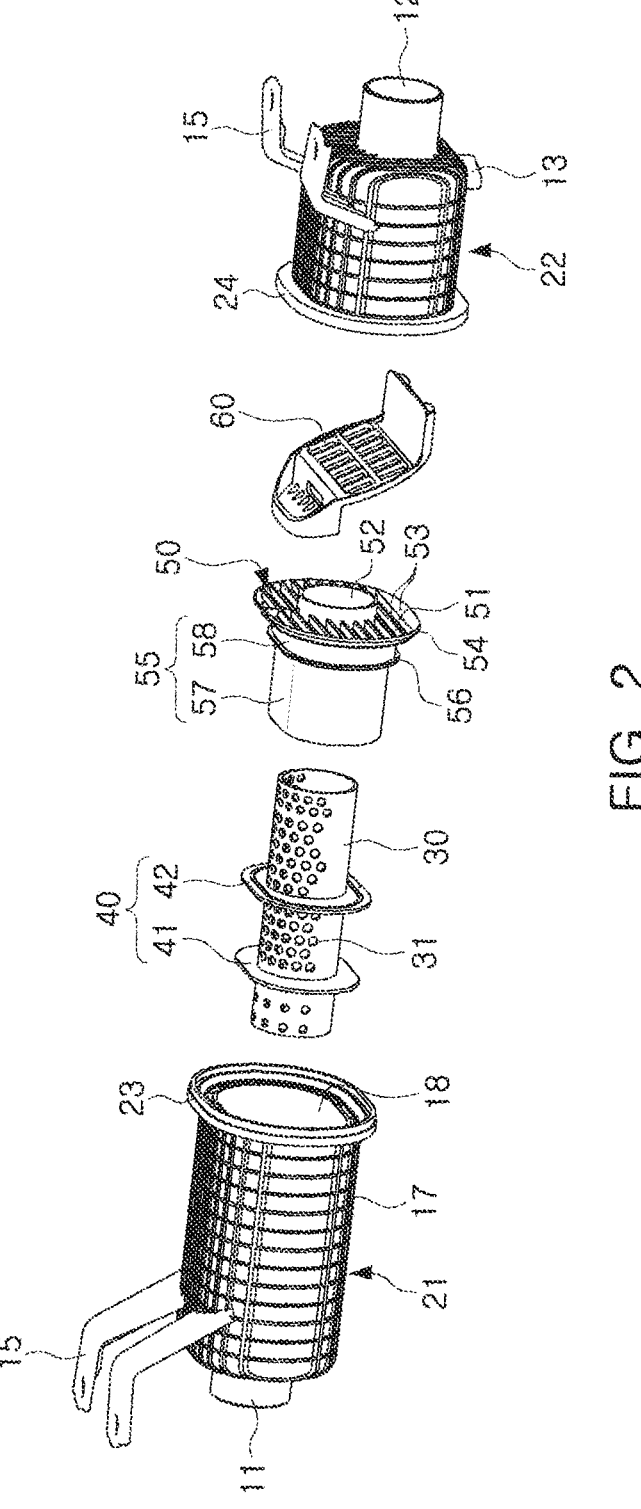
FIG. 2 is an exploded perspective view of FIG. 1.
Figure 3:
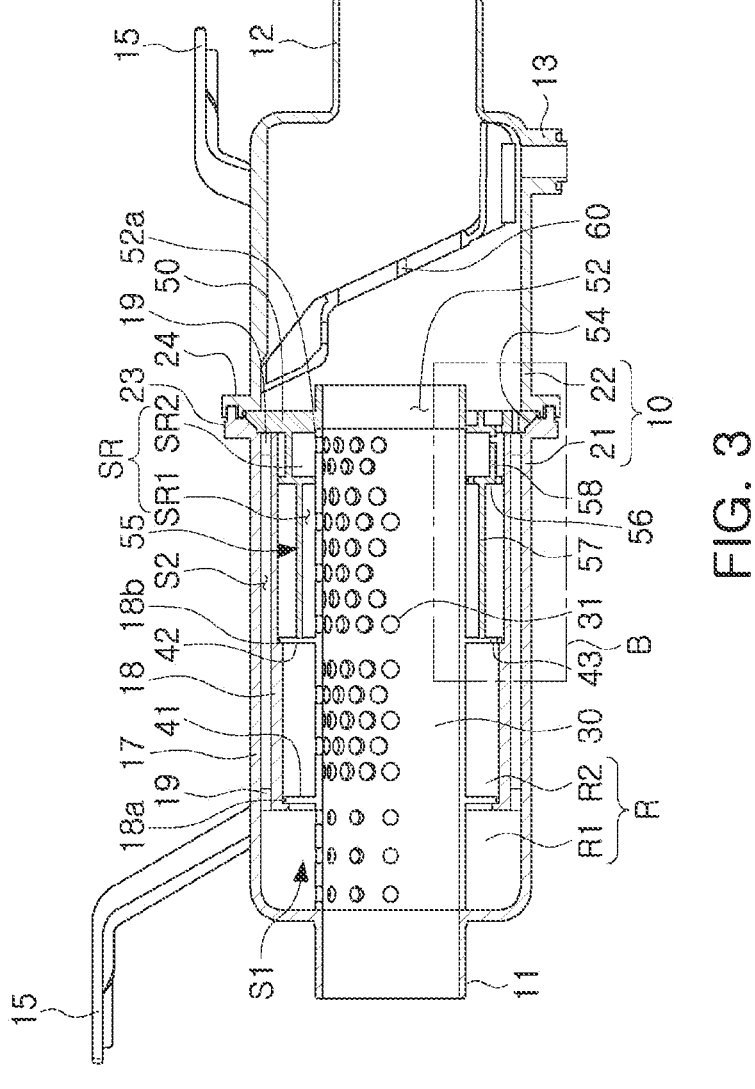
FIG. 3 is a cross-sectional view of FIG. 1.
Figure 4:
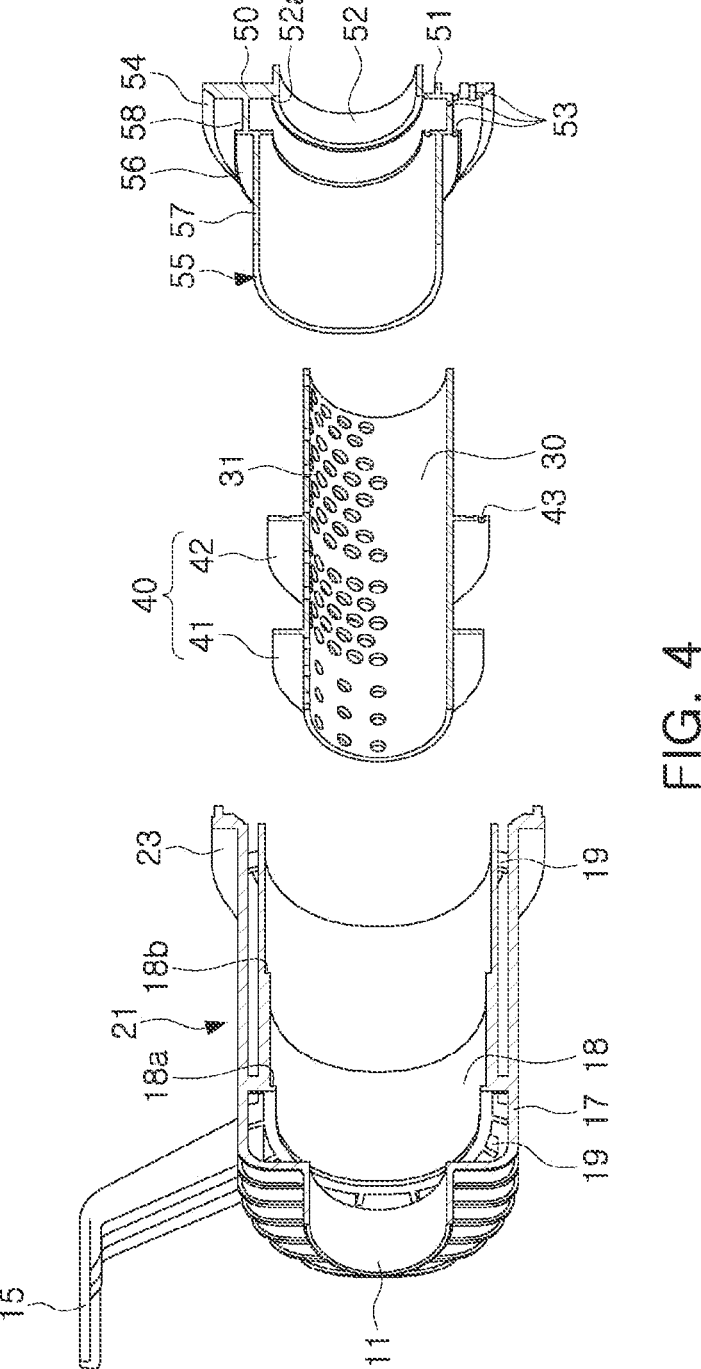
FIG. 4 is an exploded perspective view of a portion of a silencer according to an embodiment of the present disclosure.

FIG. 1 is a transparent perspective view illustrating a silencer according to a first embodiment of the present disclosure. FIG. 2 is an exploded perspective view of FIG. 1. FIG. 3 is a cross-sectional view of FIG. 1. FIG. 4 is an exploded perspective cross-sectional view of a portion of the silencer of FIG. 1, according to the first embodiment of the present disclosure.

The silencer according to the first embodiment of the present disclosure may include a housing 10, a perforated tube 30, at least one baffle 40, and a cover 50.

The housing 10 may extend to be elongated in an axial direction, and may be formed as a cylindrical member having an internal space S1. The housing may have a cross-sectional shape that is circular, oval, or polygonal, for example.

An inlet 11 through which fluid flows may be located on one side of the housing 10, and an outlet 12 provided to communicate with the outside may be located on the other side of the housing 10. The inlet and outlet can communicate with the internal space S1 in the housing 10.

In addition, a drain 13 provided to communicate with the outside may be positioned to discharge water from the housing, on the other side of the housing 10, for example, downstream of the perforated tube 30 and the cover 50. The drain may be located at the bottom of the housing adjacent the outlet 12. A drain tube 14 (see FIG. 6) may be connected to the drain 13, so that water in the housing may be discharged externally of the housing through the drain and drain tube by gravity and pressure difference.

For example, the housing 10 may be located in an exhaust system for discharging fluid from the vehicle's fuel cell stack externally. A plurality of mounting brackets 15 can be provided on an outer surface of the housing, so that the housing can be stably fixed and installed on a vehicle frame (not shown) via mounting brackets.

For convenience of manufacturing and assembly, the housing 10 may include a first case 21 having an outer tube 17 and an inner tube 18, and a second case 22 coupled to the first case.

The outer tube 17 of the first case 21 can form a portion of outer surfaces of the housing 10. The inner tube 18 can be radially inwardly spaced apart from the outer tube 17 and form a portion of inner surfaces of the housing 10.

An axial length of the inner tube 18 may be shorter than an axial length of the outer tube 17, and a cross-sectional area of the inner tube 18 can be smaller than a cross-sectional area of the outer tube 17, so that the inner tube 18 may be accommodated into the outer tube 17.

A plurality of spacers 19 may be located between the outer tube 17 and the inner tube 18, to support the inner tube relative to the outer tube and maintain a gap between the outer tube and the inner tube. A separation space S2 between the outer tube 17 and the inner tube 18 may communicate with the internal space S1 of the housing 10 and form a portion of the internal space.

Each spacer 19 may be formed of, for example, a substantially plate-shaped member, and both front ends of the spacer extending in an axial direction of the housing 10 may be connected to be fixed to the inner surface of the outer tube 17 and the outer surface of the inner tube 18, respectively. A plurality of spacers may be distributed at regular intervals from each other in a circumferential direction of the inner tube and/or the outer tube. In addition, the plurality of spacers may be formed at both ends in an axial direction of the inner tube.

The outer tube 17 and the inner tube 18 forming a first case 21 may be coaxially positioned relative to each other. An inlet 11 may be formed on one side of the first case 21, that is, the outer tube 17. In addition, a first flange 23 extending radially outwardly may be formed on an opposite side of the inlet in the first case 21, that is, at the other end of the first case.

The second case 22 may be coupled to the other end of the first case 21 to form a remaining portion of the housing 10. An outlet 12 may be formed on one side of the second case 22, and a second flange 24 extending radially outwardly may be formed on an opposite side of the outlet in the second case 22, that is, at the other end of the second case.

The inlet 11 of the first case 21 and the outlet 12 of the second case 22 may be positioned coaxially relative to each other, but an embodiment of the present disclosure is not necessarily limited thereto. In addition, a drain 13 may be formed on one side of the second case 22. As described above, the drain 13 may be located at the bottom of the second case 22 forming the housing 10, in addition to being adjacent the outlet 12.

Because moisture or water among fluid flowing into the inlet 11 can flow to a lower portion of the housing 10 by gravity and can be collected at the bottom, and because pressure inside the housing of the silencer can be higher than atmospheric pressure, water may be discharged externally of the housing through the drain 13 due to pressure difference as well as gravity.

The first flange 23 and the second flange 24 may be fixed to each other by press-fitting, bolting, fusion, or the like, whereby the first case 21 and the second case 22 may be coupled to each other to form the housing 10.

When the silencer according to the first embodiment of the present disclosure is installed in the exhaust system of the fuel cell vehicle, moisture, unreacted hydrogen, unreacted air, other foreign substances, and the like generated during power generation reaction in the fuel cell stack may flow into the first case 21 of the housing 10 through the inlet 11 in a form of fluid.

Subsequently, fluid with reduced noise may flow out from the second case 22 of the housing 10 externally through the outlet 12. In addition, water separated from the fluid may be discharged externally of the housing through the drain 13 and the drain tube 14.

The perforated tube 30 may be inserted into the housing 10 and positioned to be spaced apart from the inner surface of the housing. An axial length of the perforated tube 30 may be shorter than an axial length of the housing 10, and a cross-sectional area of the perforated tube 30 may be much smaller than that of the housing 10, so that the perforated tube may be accommodated in the housing. The perforated tube 30 may have a cross-sectional shape that is circular, oval, polygonal, or the like, for example.

Specifically, when the housing 10 includes a first case 21 and a second case 22, the perforated tube 30 may have an axial length, equal to or slightly shorter than the axial length of the outer tube 17 of the first case 21, and may have a cross-sectional area, smaller than that of the inner tube 18. As a result, the perforated tube 30 can be inserted and accommodated in the first case 21 while being radially inwardly spaced apart from the inner tube 18.

The perforated tube 30 may be positioned coaxially with the first case 21, that is, the outer tube 17 and the inner tube 18. One end of the perforated tube 30 may be directly connected to the inlet 11 of the first case 21 so that an inside of the perforated tube 30 and the inlet 11 may communicate with each other.

The perforated tube 30 may at least partially include a plurality of through-holes 31, which can be radially perforated. The plurality of through-holes 31 may be arranged in an upper region from approximately half the height to the top surface in a vertical direction of the perforated tube 30. As a result, water flowing into the perforated tube may not be discharged through a plurality of through-holes, but may pass through the perforated tube 30, and then the water may flow through the bottom of the second case 22, and be discharged externally of the housing 10 through the drain 13.

Accordingly, while the fluid introduced into the inlet 11 may flow through the perforated tube 30, sound waves may be emitted into a space between the first case 21 of the housing 10 and the perforated tube 30 through the plurality of through-holes 31. Because the sound waves can be radially emitted from the perforated tube 30 toward the first case 21, the fluid may flow smoothly and noise can be further reduced.

At least one baffle 40 may be interposed between the housing 10 and the perforated tube 30 to partition a plurality of resonance chambers R. For example, the baffle 40 may be formed of a ring-shaped plate and located between the housing 10 and the perforated tube 30 to extend in a direction (e.g., radially) intersecting an axial line of the perforated tube 30.

Optionally, at least one baffle 40 may be molded integrally with the perforated tube 30. The baffle 40 may be formed in a circumferential direction to protrude and extend radially outwardly from an outer surface of the perforated tube 30, in a state in which the perforated tube is inserted into the housing 10, so that an end of the baffle may contact an inner surface of the housing 10 to partition a plurality of resonance chambers R.

Specifically, the first baffle 41 may partition the space between the housing 10 and the perforated tube 30 into two spaces, that is, a first resonance chamber R1 and a second resonance chamber R2.

For example, when the housing 10 includes a first case 21 and a second case 22, the first baffler 41 may be located adjacent an upstream end of the inner tube 18 of the first case 21, to partition a first resonance chamber R1 formed as a space between the outer tube 17 and the perforated tube 30 and a second resonance chamber R2 formed as a space between the inner tube 18 and the perforated tube 30.

Because a separation space S2 between the outer tube 17 and the inner tube 18 may communicate with the internal space S1 of the housing 10, the separation space may be included in the first resonance chamber R1.

Optionally, for positioning the first baffle 41, a step portion 18a protruding radially inwardly may be formed at the upstream end of the inner tube 18.

In addition, a second baffle 42 may be located downstream of the first baffle 41. The second baffle 42 may partition the space between the inner tube 18 and the perforated tube 30 into two spaces, that is, a second resonance chamber R2 and an auxiliary resonance chamber SR.

Optionally, for positioning the second baffle 42, a step portion 18b may be formed on the inner surface of the inner tube 18, so that the upstream surface protrudes radially inwardly and the downstream surface recesses radially outwardly. A cross-sectional area of the second baffle 42 may be greater than the cross-sectional area of the first baffle 41.

In addition, the second baffle 42 may further include at least one drain hole 43, perforated in the axial direction of the housing 10. The drain hole 43 may be formed on a lower portion of the second baffle 42 to be adjacent a portion in which the second baffle is in contact with the step portion 18b. The drain hole 43 may form a water passage through which water rising in the lower portion of the second resonance chamber R2 can be discharged externally of the housing through the drain 13 provided in the second case 22 of the housing 10.

The number or shape of the baffles 40 is not necessarily limited to the example illustrated above, and it can be added, subtracted, or changed per different designs and variations.

The cover 50 may be installed in the housing 10 to support the other end of the perforated tube 30 and to partition the most downstream resonance chamber among the plurality of resonance chambers R. The cover may be formed of a plate having a ring shape and a predetermined or selected thickness. The cover may have a plurality of ribs 51 formed on one side surface to ensure rigidity.

An outer edge of the cover 50 may be formed to be press-fitted and fixed to the inner surface of the housing 10. However, the coupling method between the cover and the housing is not necessarily limited to press fitting, and may be coupled to each other by, for example, bolting, fusion, or the like.

A through-hole 52 having the same shape and size as an opening of the perforated tube 30 may be formed in a center of the cover 50. The other end of the perforated tube may be directly connected to a through-hole of the cover, so that an inside of the perforated tube and the through-hole may communicate with each other. For example, a step portion 52a or a step groove may be formed to form-fit each other, on at least one of the other end of the perforated tube 30 and one end of the through-hole 52.

Fluid flowing from the inlet 11 through the perforated tube 30 may smoothly pass through the cover 50 without obstruction or interference, and may be discharged externally of the housing through an outlet 12 provided in the second case 22 of the housing 10.

In the cover 50, a portion of the cover 50 between a through-hole 52 and an outer edge 54 may partition the most downstream resonance chamber among the plurality of resonance chambers R, for example, the auxiliary resonance chamber SR, and close the separation space S2 between the outer tube 17 and the inner tube 18.

Figure 5:
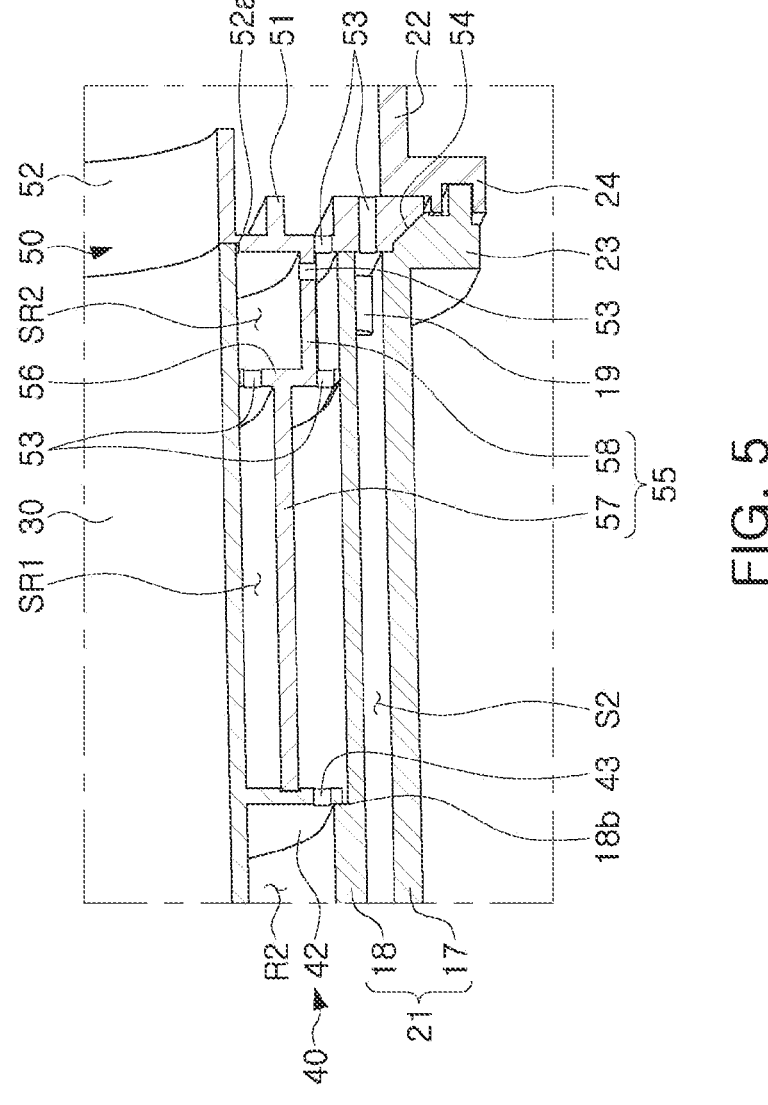
FIG. 5 is an exploded perspective view of portion B of FIG. 3.

FIG. 5 is an enlarged view of portion B of FIG. 3.

Optionally, the cover 50 may further include an extension tube 55 formed to protrude upstream within a space between the first case 21 of the housing 10 and the perforated tube 30, for example, the auxiliary resonance chamber SR between the inner tube 18 and the perforated tube 30. The extension tube 55 may be molded integrally with the cover 50.

The extension tube 55 may be formed to surround a portion of the perforated tube 30, so that when the perforated tube is inserted into the housing 10, an end of the extension tube is in contact with, for example, the second baffle 42 to tune a volume of the auxiliary resonance chamber SR.

In addition, the extension tube 55 may include a partition wall 56 formed between the inner tube 18 of the first case 21 and the perforated tube 30 to extend in a direction (e.g., radially) intersecting an axial line of the perforated tube.

The partition wall 56 may be formed of a ring-shaped plate and molded integrally with the extension tube 55. By this partition wall, the extension tube 55 may be partitioned into a first extension portion 57 located upstream of the partition wall 56 and a second extension portion 58 located downstream of the partition wall 56.

In addition, the extension tube 55 may be partitioned into two extension portions by the partition wall 56, so that the auxiliary resonance chamber SR between the extension tube 55 and the perforated tube 30 may be partitioned into two auxiliary resonance chambers, that is, a first auxiliary resonance chamber SR1, partitioned by the first extension portion 57 and the partition wall 56 and a second auxiliary resonance chamber SR2, partitioned by the second extension portion 58 and the partition wall 56.

Optionally, an axial length of the first extension portion 57 and the second extension portion 58 may be different from each other. In addition, the first extension portion 57 and the second extension portion 58 may be formed to have different radial distances from the perforated tube 30, respectively. In other words, by adjusting the axial length of the first extension portion 57 and the second extension portion 58 and the radial distance thereof from the perforated tube 30, respectively, a volume of the first auxiliary resonance chamber SR1 and the second auxiliary resonance chamber SR2 may be changed or adjusted.

As illustrated in FIG. 5, drain holes 53 may be formed in the partition wall 56 and the second extension portion 58 forming the extension tube 55. At least one drain hole 53 may be formed in the partition wall 56 and the second extension portion 58 below and/or at a lower portion of the extension tube 55.

In addition, a drain hole 53 may also be formed below the cover 50 at or near a point where it meets the inner tube 18 of the first case 21, respectively, radially inwardly of and outwardly of the inner tube.

These drain holes 53 may form a water passage so that water rising inside the second resonance chamber R2, the separation space S2 between the outer tube 17 and the inner tube 18, the auxiliary resonance chamber SR including the first auxiliary resonance chamber SR1 and the second auxiliary resonance chamber SR2, and the like, can be discharged externally of the housing through the drain 13 provided in the second case 22 of the housing 10.

The silencer according to the first embodiment of the present disclosure may further include an etching filter 60 located downstream of the perforated tube 30 and the cover 50 in the housing 10 to separate liquid from fluid. Specifically, when the housing 10 includes the first case 21 and the second case 22, the etching filter 60 may be installed between the through-hole 52 and the outlet 12 of the cover in the second case 22.

The etching filter 60 may be formed approximately in a plate shape, and may include a plurality of micropores (not shown) that allow gases such as unreacted hydrogen, unreacted air, or the like to pass through, but do not allow liquid such as moisture, water, or the like, to pass therethrough. The etching filter may be located obliquely in the housing 10, but the present disclosure is not necessarily limited thereto.

The micropores may be formed to have a size so that at least a portion of the moisture in the fluid is separated from the fluid while the fluid passes through the micropores. For example, the micropores may have a diameter or width in a range of about 100 to 500 μm.

In the silencer according to the first embodiment of the present disclosure configured as described above, a space for reducing noise is disposed upstream, a space for separating gas and liquid is disposed downstream, and a cover 50 dividing these spaces is applied. By disposing the space for separating gas and liquid next to the space for reducing noise, the silencer of the present disclosure may first remove noise from fluid and then discharge the fluid, so that the silencer may have an advantage of reducing discharge sound of water discharged through the drain 13 and the drain tube 14.

Moreover, in the silencer according to the first embodiment of the present disclosure, a sound-absorbing material may be omitted and a plurality of resonance chambers R may be applied, and the silencer may tune each resonance chamber differently to reduce noise of a specific frequency in each resonance chamber. Accordingly, the silencer of the present disclosure can not only significantly reduce high-frequency noise such as high-speed airflow sound, but also maintain constant noise reduction performance because there is no problem of moisture absorption by the sound-absorbing material.

In addition, because a separate sound-absorbing material is not applied to the silencer according to the first embodiment of the present disclosure, it is possible to obtain an additional effect for reducing costs, and thus for improving competitiveness of the product.

Figure 6:
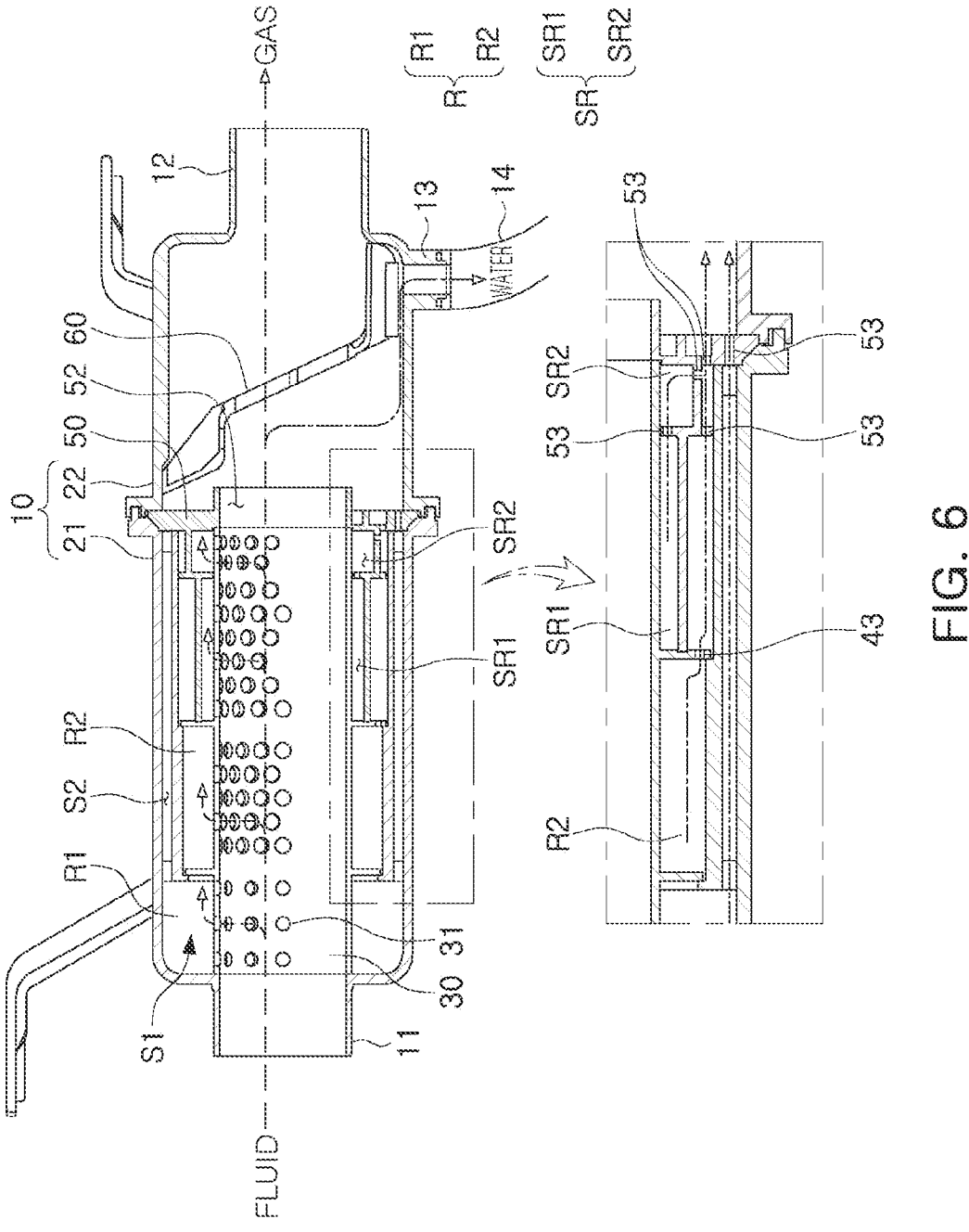
FIG. 6 is a diagram illustrating a flow of fluid in a silencer according to an embodiment of the present disclosure.

FIG. 6 is a diagram illustrating a flow of fluid in a silencer according to the first embodiment of the present disclosure.

When the silencer according to the first embodiment of the present disclosure is installed in an exhaust system of a fuel cell vehicle to reduce noise, noise at a main frequency of interest may be high-frequency noise in an approximately 1 to 3 kHz band. To reduce such high-frequency noise, in the silencer according to the first embodiment of the present disclosure, by changing the number and position of the baffles 40 and a structure of the cover 50 using a limited space within the first case 21 of the housing 10, the silencer may tune each resonance chamber R and/or auxiliary resonance chamber SR to reduce noise of a specific frequency.

More specifically, for example, as illustrated in FIG. 6, in the silencer according to the first embodiment of the present disclosure, a first resonance chamber R1, a second resonance chamber R2, a first auxiliary resonance chamber SR1, and a second auxiliary resonance chamber SR2, that is, a total of four resonance spaces, may be sequentially partitioned and disposed from upstream to downstream around the perforated tube 30 in the first case 21 of the housing 10.

These resonance spaces may be substantially independently separated, so fluid cannot flow between the resonance spaces. However, as illustrated in FIG. 6, fluid can enter and exit the resonance space, that is, each resonance chamber R and/or each auxiliary resonance chamber SR only through the perforated tube 30 communicating with all resonance spaces.

A Helmholtz resonator modified to include a perforated tube 30 may be applied to the resonance space. The Helmholtz resonator serves to absorb and resonate noise of a specific frequency and cancels the noise out through interference. A Helmholtz resonance frequency may be determined by Equation 1.

$$f = \frac{c}{2\pi} \sqrt{\frac{S}{VL}} \qquad \text{[Equation 1]}$$

Here, f may be a resonance frequency, c may be a speed of sound, S may be an area of the through-hole 31, V may be a volume of the resonance chamber R or auxiliary resonance chamber SR, and L may be a length of the through-hole 31, that is a thickness of the perforated tube 30.

According to Equation 1, for example, to reduce high-frequency noise using a resonance chamber R and/or an auxiliary resonance chamber SR to which a Helmholtz resonator is applied, the volume V of the resonance chamber R or auxiliary resonance chamber SR may be reduced, the length L of the through-hole 31 may be shortened, and the area S of the through-hole may be increased, for example.

More specifically, a first resonance chamber R1 including a space between the outer tube 17 and the perforated tube 30 and a separation space S2 between the outer tube 17 and the inner tube 18 may reduce high-frequency noise, for example, at approximately 1 kHz.

By increasing a volume V of the first resonance chamber R1 by adding the separation space S2, relatively low high-frequency noise, that is, high-frequency noise of 1 kHz, may be reduced.

The second resonance chamber R2 formed as the space between the inner tube 18 and the perforated tube 30 may reduce high-frequency noise of approximately 2 kHz, for example.

Compared to the first resonance chamber R1, by increasing the number of through-holes 31 of the corresponding perforated tube 30, or increasing the area of the through-hole, and reducing the volume V of the second resonance chamber R2, high-frequency noise, higher than the resonance frequency of the first resonance chamber, that is, 2 kHz, may be reduced.

Next, the first auxiliary resonance chamber SR1 formed as the space between the first extension portion 57 of the extension tube 55 provided in the cover 50 and the perforated tube 30 may reduce high-frequency noise of approximately 2.5 kHz.

Compared to the first resonance chamber R1 and the second resonance chamber R2, by greatly increasing the number of through-holes 31 of the corresponding perforated tube 30, or greatly increasing the area of the through-hole, and relatively reducing the volume V of the first auxiliary resonance chamber SR1, high-frequency noise, higher than the resonance frequency of the first resonance chamber and the second resonance chamber, that is, 2.5 kHz, may be reduced.

The second auxiliary resonance chamber SR2 formed as the space between the second extension portion 58 of the extension tube 55 provided in the cover 50 and the perforated tube 30 may reduce high-frequency noise of approximately 3 kHz.

Compared to the first resonance chamber R1, the second resonance chamber R2, and the first auxiliary resonance chamber SR1, by significantly reducing the volume V of the second auxiliary resonance chamber SR2, high-frequency noise, higher than the resonance frequency of other resonance chambers or the first auxiliary resonance chamber, that is, 3 kHz, may be reduced.

In each resonance chamber R and/or auxiliary resonance chamber SR, for example, when a specific sound wave generated in an exhaust system of a fuel cell vehicle enters through the plurality of through-holes 31 of the perforated tube 30, the corresponding sound wave changes into a new vibration in an opposite phase of the waveform and comes out of the resonance chamber and/or the auxiliary resonance chamber. Therefore, phase cancellation may occur for a specific frequency, allowing noise in the exhaust system to be eliminated or attenuated significantly.

The through-hole 31 of the perforated tube 30 may have different numbers and areas to tune the resonance frequency corresponding to each resonance chamber R and/or each auxiliary resonance chamber SR, and a perforation rate, which is a ratio of the area of the through-hole to a surface area of the perforated tube, may be set within a range of approximately 10 to 20%.

In addition, to prevent water accumulated in the perforated tube 30 from flowing into the resonance chamber R or the auxiliary resonance chamber SR, as described above, a plurality of through-holes 31 may be disposed in an upper region from approximately half the height to the top surface of the perforated tube in a vertical direction. As a result, the water flowing into the perforated tube can be less likely or is not discharged through a plurality of—through holes, but instead can pass through the perforated tube, and then flow through the bottom of the second case 22, and may be discharged externally of the housing 10 through the drain 13.

Despite a design hindering water from entering the resonance chambers, water flowing into each resonance chamber R or each auxiliary resonance chamber SR may be discharged from each resonance chamber and each auxiliary resonance chamber, through the drain holes 43 and 53, formed in the baffle 40, the partition wall 56, the second extension portion 58, the cover 50, or the like, as illustrated in FIG. 6, and together with moisture separated from gas in the etching filter 60, the water may be discharged externally through the drain hole 13 and drain tube 14 provided in the second case 22 of the housing 10.

The number, shape, and size of the resonance spaces, including the first resonance chamber R1, the second resonance chamber R2, the first auxiliary resonance chamber SR1, and the second auxiliary resonance chamber SR2, are not necessarily limited to the above-described examples, and it should be noted that these may be added, subtracted, or changed, as required.

Figure 7:
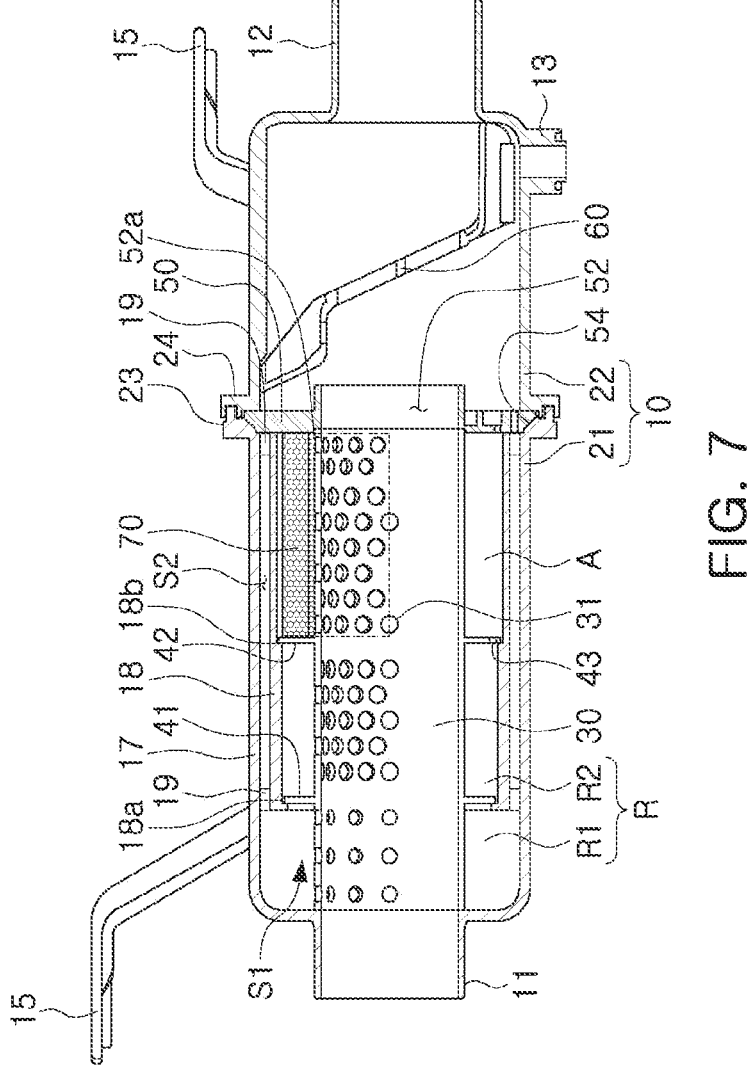
FIG. 7 is a cross-sectional view illustrating a silencer according to an embodiment of the present disclosure.

FIG. 7 is a cross-sectional view illustrating a silencer according to a second embodiment of the present disclosure.

The silencer according to a second embodiment may include a housing 10, a perforated tube 30, at least one baffle 40, and a cover 50.

The second embodiment shown in FIG. 7 can be different only in that a sound-absorbing material 70 is combined, and the remaining components can be the same as those of the first embodiment. Accordingly, in describing the silencer according to the second embodiment, the same components as those of the silencer according to the above-described first embodiment will be assigned the same reference numerals and detailed description of the structure and function thereof will be omitted.

By at least partially placing the sound-absorbing material 70 in the most downstream resonance chamber among a plurality of resonance chambers R, for example, an auxiliary resonance chamber SR, in the silencer according to the second embodiment of the present disclosure, the corresponding resonance chamber may be changed to a sound-absorbing chamber A.

The sound-absorbing chamber A may be partitioned into a space between a baffle placed in at least one baffle 40 or the most downstream of a plurality of baffles and a cover 50, and between an inner tube 18 of a first case 21 and a perforated tube 30. In this case, the cover 50 can be molded integrally with the perforated tube 30.

Within the sound-absorbing chamber A, the sound-absorbing material 70 may be placed in an upper region from approximately half the height to the top surface of the inner tube 18 of the first case 21 in a vertical direction. As a result, water flowing into the sound-absorbing chamber of the inner tube 18 or the perforated tube 30 can be hindered from being absorbed or cannot be absorbed by the sound-absorbing material, and noise reduction performance can be maintained at a constant level.

As the sound-absorbing material 70, for example, a porous sound-absorbing material formed of a material such as high-density polyethylene (HDPE) may be adopted, but embodiments of the present disclosure are not necessarily limited thereto, and a sound-absorbing material formed of glass wool or the like may be adopted, for example.

Meanwhile, compared to a first resonance chamber R1 and a second resonance chamber R2, the number of through-holes 31 of the perforated tube 30 corresponding to the sound-absorbing chamber A may be greatly increased and an area of the through-holes may be greatly reduced. Similar to the first embodiment, a plurality of through-holes 31 may be arranged in the upper region from approximately half the height to the top surface of the perforated tube 30 in the vertical direction.

Accordingly, while fluid containing moisture, unreacted hydrogen, unreacted air, and the like flows through the perforated tube 30, sound waves can be radiated toward the sound-absorbing material 70 through a plurality of through-holes 31, and the sound waves entering the sound-absorbing material may be converted into thermal energy by friction between particles of gas and an inner surface of fine pores of the sound-absorbing material, so that noise may be reduced.

By such sound absorption, the silencer according to the second embodiment of the present disclosure may improve noise reduction performance for high frequency of approximately 2 kHz or higher.

Figure 8:
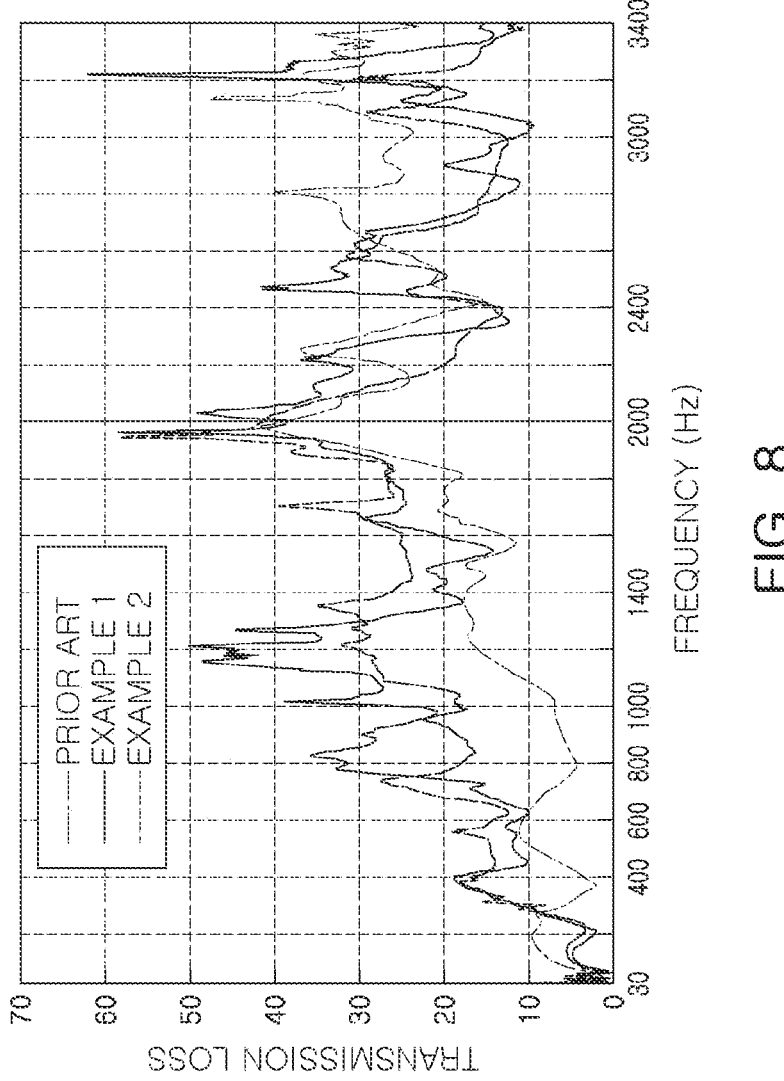
FIG. 8 is a graph illustrating evaluation of noise reduction performance compared to the prior art by manufacturing a sample of a silencer according to an embodiment of the present disclosure.

FIG. 8 is a graph illustrating evaluation of noise reduction performance compared to the prior art by manufacturing a sample of a silencer according to the first and second embodiments of the present disclosure.

The present applicant manufactured a silencer according to first and second embodiments of the present disclosure with a 3D printer, together with a silencer with only a built-in porous sound-absorbing material without a resonance chamber according to the prior art, and then measures a transmission loss to evaluate noise reduction performance.

The transmission loss of the silencer may be defined as a ratio of a sound output incident on the silencer to a sound output transmitted through the silencer.

Looking at the evaluation results shown in FIG. 8, it can be seen that compared to the prior art, in the silencer according to the first and second embodiments of the present disclosure, the transmission loss is improved by 10 dB or more in a band of 2 kHz or less.

Therefore, by applying a resonance chamber including a perforated tube, and optimizing a thickness of the perforated tube 30, the number and area of the through-holes 31, and/or a volume V of a resonance chamber R and/or an auxiliary resonance chamber SR, the silencer according to an embodiment of the present disclosure may significantly reduce noise in a specific frequency band.

As described above, according to an embodiment of the present disclosure, not only can high-frequency noise be significantly reduced in a limited space without a separate sound-absorbing material, but also noise reduction performance may be maintained to be constant because there is no problem with moisture absorption by the sound-absorbing material.

In addition, according to an embodiment of the present disclosure, costs can be reduced because a separate sound-absorbing material is not applied, thereby improving competitiveness of a product.

In addition, according to an embodiment of the present disclosure, by placing a gas-liquid separation space downstream of a noise reduction space, an effect of reducing a discharge sound of water discharged through a drain tube can be obtained.

The aforementioned description merely illustrates technical concepts of the present disclosure, and a person skilled in the art to which the present disclosure pertains may make various modifications and modifications without departing from the scope of the present disclosure.

Therefore, the example embodiments disclosed in this specification and drawings are not intended to necessarily limit but to explain technical concepts of the present disclosure, and the scope of the technical ideas of the present disclosure is not necessarily limited by these example embodiments. The scope of protection of the present disclosure can be interpreted by the following claims, and all technical ideas within the scope equivalent thereto can be interpreted as being included in the scope of the present disclosure.

What is claimed is:

1. A silencer, comprising:
a housing having an inlet and an outlet;
a perforated tube located in the housing, the perforated tube having a plurality of through-holes;
at least one baffle interposed between the housing and the perforated tube to partition an internal space between the housing and the perforated tube into a plurality of resonance chambers; and
a cover installed in the housing to support the perforated tube and partition the most downstream resonance chamber.

2. The silencer of claim 1, wherein the housing comprises:
a first case having an outer tube and an inner tube; and
a second case coupled to the first case, wherein the inlet is formed in the outer tube, and the outlet is formed in the second case.

3. The silencer of claim 2, further comprising a plurality of spacers located between the outer tube and the inner tube to support the inner tube relative to the outer tube and to maintain a gap between the outer tube and the inner tube, and configured such that a separation space between the outer tube and the inner tube communicates with the internal space of the housing.

4. The silencer of claim 3, further comprising a through-hole formed in the cover, wherein the perforated tube is radially inwardly spaced apart from the inner tube and is accommodated in the first case, wherein a first end of the perforated tube is connected to the inlet, and wherein a second end of the perforated tube is connected to the through-hole.

5. The silencer of claim 4, wherein the at least one baffle comprises a first baffle, the first baffle being located at an upstream end of the inner tube, to partition a first resonance chamber, formed as a first resonance space between the outer tube and the perforated tube, and a second resonance chamber formed as a second resonance space between the inner tube and the perforated tube.

6. The silencer of claim 5, wherein the first resonance chamber is configured to reduce noise of a frequency lower than that of the second resonance chamber.

7. The silencer of claim 5, wherein the at least one baffle further comprises a second baffle located downstream of the first baffle, and the second baffle being configured to partition the internal space between the inner tube and the perforated tube into the second resonance chamber and an auxiliary resonance chamber.

8. The silencer of claim 7, wherein the second baffle comprises at least one drain hole formed therein and perforated along an axial direction of the housing, and the at least one drain hole being located at a lower portion of the second baffle.

9. The silencer of claim 4, wherein the cover further comprises an extension tube formed to protrude upstream between the inner tube and the perforated tube, wherein an end of the extension tube contacts the at least one baffle.

10. The silencer of claim 9, wherein the extension tube comprises a partition wall formed between the inner tube and the perforated tube to extend in a direction intersecting an axial line of the perforated tube, wherein the partition wall is configured to divide the extension tube into a first extension portion located upstream of the partition wall and a second extension portion located downstream of the partition wall.

11. The silencer of claim 10, wherein the internal space defined between the extension tube and the perforated tube is divided into a first auxiliary resonance chamber, partitioned by the first extension portion and the partition wall, and a second auxiliary resonance chamber partitioned by the second extension portion and the partition wall.

12. The silencer of claim 11, wherein an axial length of the first extension portion and the second extension portion, and a distance of the first extension portion and the second extension portion from the perforated tube, respectively, define a volume of the first auxiliary resonance chamber and the second auxiliary resonance chamber, respectively.

13. The silencer of claim 10, wherein each of the cover, the partition wall, and the second extension portion comprises at least one drain hole located at a lower portion thereof.

14. A silencer, comprising:
a housing having an inlet and an outlet;
a perforated tube located in the housing, the perforated tube having a plurality of through-holes, wherein the plurality of through-holes are arranged in an upper region from about half a height to the top surface in a vertical direction of the perforated tube;
at least one baffle interposed between the housing and the perforated tube to partition an internal space between the housing and the perforated tube into a plurality of resonance chambers; and
a cover installed in the housing to support the perforated tube and partition the most downstream resonance chamber.

15. The silencer of claim 14, wherein a perforation rate, which is a ratio of an area of the plurality of through-holes to a surface area of the perforated tube, is in a range of 10% to 20%.

16. The silencer of claim 1, further comprising an etching filter located downstream of the perforated tube and the cover in the housing, the etching filter being configured to separate liquid from fluid.

17. The silencer of claim 16, further comprising a drain formed in the housing downstream of the perforated tube and the cover, wherein the drain is configured to communicate the internal space with an outside of the housing.

18. The silencer of claim 1, further comprising a sound-absorbing material that is at least partially located in a most downstream resonance chamber.

19. A vehicle comprising:

an exhaust system; and a silencer disposed in the exhaust system, wherein the silencer comprises:

a housing having an inlet and an outlet;

a perforated tube located in the housing, the perforated tube having a plurality of through-holes;

at least one baffle interposed between the housing and the perforated tube to partition an internal space between the housing and the perforated tube into a plurality of resonance chambers; and a cover installed in the housing to support the perforated tube and partition the most downstream resonance chamber.

20. The vehicle of claim 19, wherein the exhaust system is connected to a humidifier of a fuel cell system.

* * * * *